United States Patent [19]

Lemelson

[11] 4,305,704
[45] Dec. 15, 1981

[54] APPARATUS FOR FORMING AND THREADING TUBING

[76] Inventor: Jerome H. Lemelson, 85 Rector St., Metuchen, N.J. 08840

[21] Appl. No.: 69,354

[22] Filed: Aug. 24, 1979

Related U.S. Application Data

[63] Continuation-in-part of Ser. No. 568,615, Apr. 16, 1975, abandoned, which is a continuation-in-part of Ser. No. 319,985, Jan. 2, 1973, Pat. No. 3,944,641, which is a continuation-in-part of Ser. No. 68,724, Sep. 1, 1970, Pat. No. 3,703,253, which is a continuation-in-part of Ser. No. 736,081, Jun. 11, 1968, Pat. No. 3,587,281.

[51] Int. Cl.$^3$ .................. B29D 1/00; B29C 17/10; B29D 23/04
[52] U.S. Cl. .................. 425/296; 425/142; 425/155; 425/163; 425/164; 425/304; 425/380; 425/385; 425/460; 425/DIG. 218
[58] Field of Search .............. 425/142, 196, 296, 301, 425/302.1, 304, 309, 311, 380, 381, 460, 465, 466, DIG. 218, 155, 163, 164, 385

[56] References Cited

U.S. PATENT DOCUMENTS

| | | | |
|---|---|---|---|
| 2,497,724 | 2/1950 | Gilson et al. | 425/309 |
| 2,754,562 | 7/1956 | Webb | 425/309 |
| 2,931,069 | 4/1960 | McCormick | 264/DIG. 52 |
| 3,329,998 | 7/1967 | Stohr | 425/72 |
| 3,387,069 | 6/1968 | Stohr | 264/145 |
| 3,540,094 | 11/1970 | Janssen | 425/381 |

*Primary Examiner*—James B. Lowe

[57] ABSTRACT

An apparatus and method for continuously forming tubing by extrusion wherein selected positions of the length of the tubing are irregularly shaped with a formation such as a pipe or tube thread and wherein such forming occurs while the tubing is passing from the extrusion die. The apparatus also includes means for predeterminately cutting the extruding tube to lengths with each length containing a thread-like formation in its wall at either or both ends thereof. As a result the necessity of post operating on the extrusion in a secondary threading operation to form threads at its ends, is eliminated.

10 Claims, 5 Drawing Figures

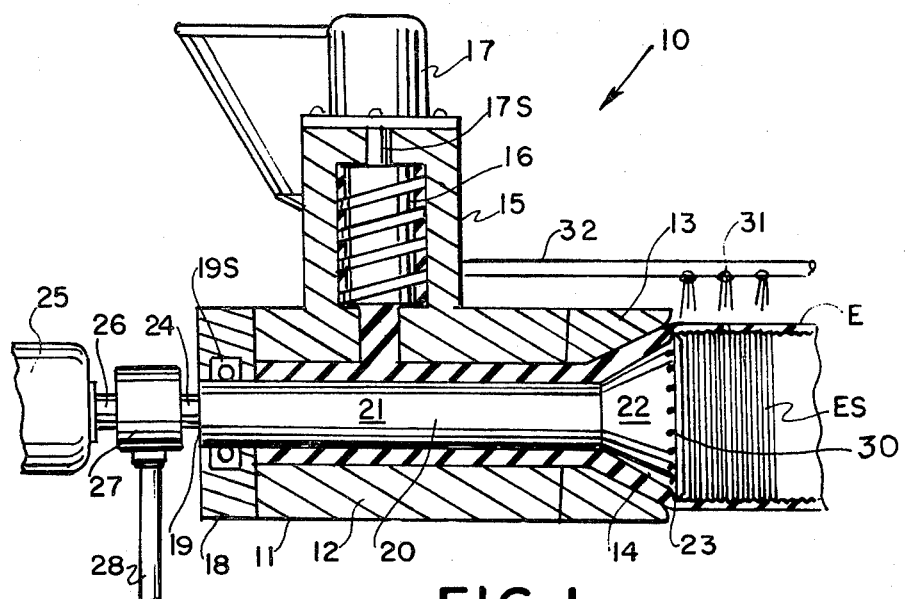
FIG.1
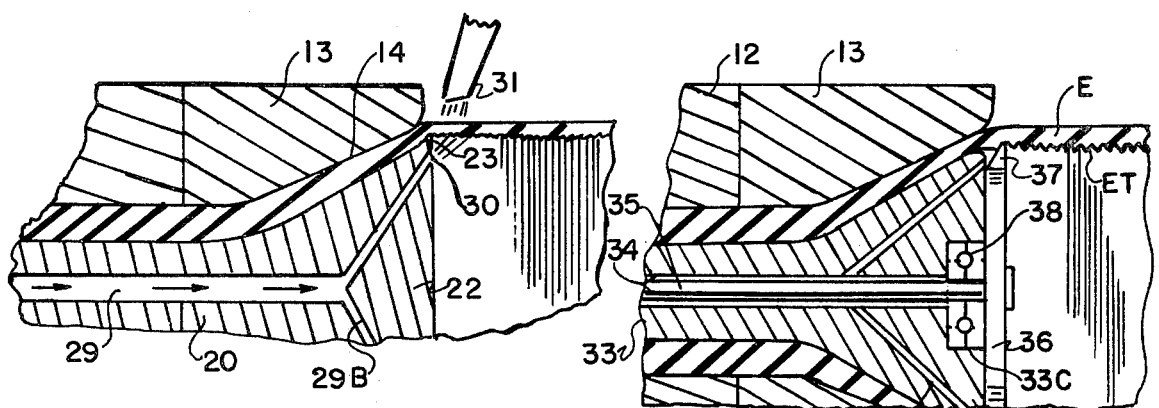
FIG.2
FIG.3
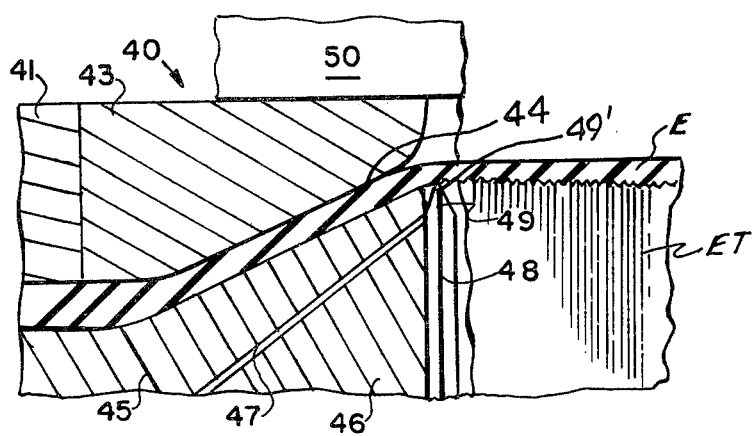
FIG.4

APPARATUS FOR FORMING AND THREADING TUBING

RELATED APPLICATIONS

This is a continuation-in-part of Ser. No. 568,615 filed Apr. 16, 1975, now abandoned, for Tube Fabricating Apparatus and Method. which was a continuation-in-part of Ser. No. 319,985 filed Jan. 2, 1973, now U.S. Pat. No. 3,944,641 as a continuation-in-part of Ser. No. 68724 filed Sept. 1, 1970 now U.S. Pat. No. 3,703,253 which was a continuation-in-part of Ser. No. 736,081 filed June 11, 1968 now U.S. Pat. No. 3,587,281.

SUMMARY OF THE INVENTION

This invention relates to an apparatus and method for operating on extrusions as or immediately after they are formed for forming irregular formations in selected lengths of the extrusions, such as fastening threads. After the formation of the threading in a selected length of the extrusion, an automatic cutting tool is operated to cut the extrusion either adjacent to one end of the threading or intermediate the ends of the threading so that lengths of tubes may be formed each containing either or both ends thereof provided with fastening threads which may be used in joining either similar lengths of such tubing together when assemblies of such tubing are desired or to threadably receive and retain pipe joints and fittings, valves, pumps or other devices to the tubing.

Before the instant invention, it was known in the art to form pipe and tubing by extrusion or casting wherein, if it was desired to provide fastening threads at the ends of such tubing or pipe, such thread forming required a secondary operation such as one requiring the use of a threading tool. This operation requires substantial rehandling of the tube or pipe to present it to the thread forming tool, align it therewith and tighten such tube in a fixture to permit threading, not to mention the necessity of unlocking the clamp or fixture after threading and further handling of the tube. All such secondary operations are time consuming and frequently require costly labor.

The instant invention is concerned primarily with an automatically operating apparatus which automatically forms tubing, automatically formes threads in such tubing as it is formed and thereafter automatically cuts the formed tubing at predetermined locations of its length as it exists from the forming die and after the threading has been formed in a selected portion of its length. By employing such apparatus to form and thread tubing, secondary operations on cut lengths of tubing are eliminated thereby effecting savings in handling and labor costs and increasing production rate. By program or computer controlling the extrusion, thread forming and cutting operations, pipes or tubes of different lengths and having thread formations at either or both ends thereof wherein the lengths of the thread formations may be varied for different joining operations, may be automatically formed to shape and length without the need for manual operations of any kind and with a minimum waste of material. In one form, tooling at the end of a mandrel is rotationally moved by rotating the die while such tool is projected therefrom to spirally or circularly shape grooves or striations in the surface of the wall of the pipe or extrusion formed over or against the mandrel. In yet another form, tooling mounted on the mandrel is projectible therefrom against the surface of the extrusion immediately adjacent the mandrel and forms grooves, striations or other configurations in the surface stratum thereof. In still another form of the invention, the mandrel and/or die are caused to vary in dimension by intense magnetic fields generated in the vicinity thereof and varied during extrusion so as to cause a variation in the shaping of the extrusion along its length.

Accordingly, it is a primary object of this invention to provide a new and improved apparatus and method for forming and shaping extrusions either as they are formed within the extrusion die or immediately after they leave the die.

Another object is to provide an apparatus and method for forming an extrusion after it has been shaped in a die and while still in an easily deformable condition before it has completely set or solidified so as to facilitate the operation.

Another object is to provide an apparatus for variably shaping an extrusion by rotating tooling on a mandrel on which the extrusion is formed and varying its configuration by varying the magnetic field in a known manner during extrusion.

Another object is to provide means for automatically forming threads in an extrusion, as it is extruded to shape, by variably operating tooling supported at the end of an extrusion die through which the extrusion is passed.

With the above and such other objects in view as may hereinafter more fully appear, the invention consists of the novel constructions, combinations and arrangements of parts as well as methods of fabrication which will be more fully described and illustrated in the accompanying drawings, but it is to be understood that changes, variations and modifications may be resorted to which fall within the scope of the invention as claimed.

In the drawings:

FIG. 1 is a side view with parts broken away for clarity of an extrusion apparatus having an extrusion die and mandrel with means for moving the mandrel during the extrusion operation FIG. 2 is a side view with parts broken away for clarity of a portion of an extrusion apparatus which is a modification of that shown in FIG. 1 and which employs electromagnetic means for varying the configuration of either or both the die and mandrel located within the die.

FIG. 3 is a side view of an extrusion apparatus which has a rotatable blade for forming a spiral thread-like groove on the side of a tubular extrusion.

FIG. 4 is a side view of an extrusion apparatus for serrating or roughening the inside of a tubular extrusion.

Figure 5:
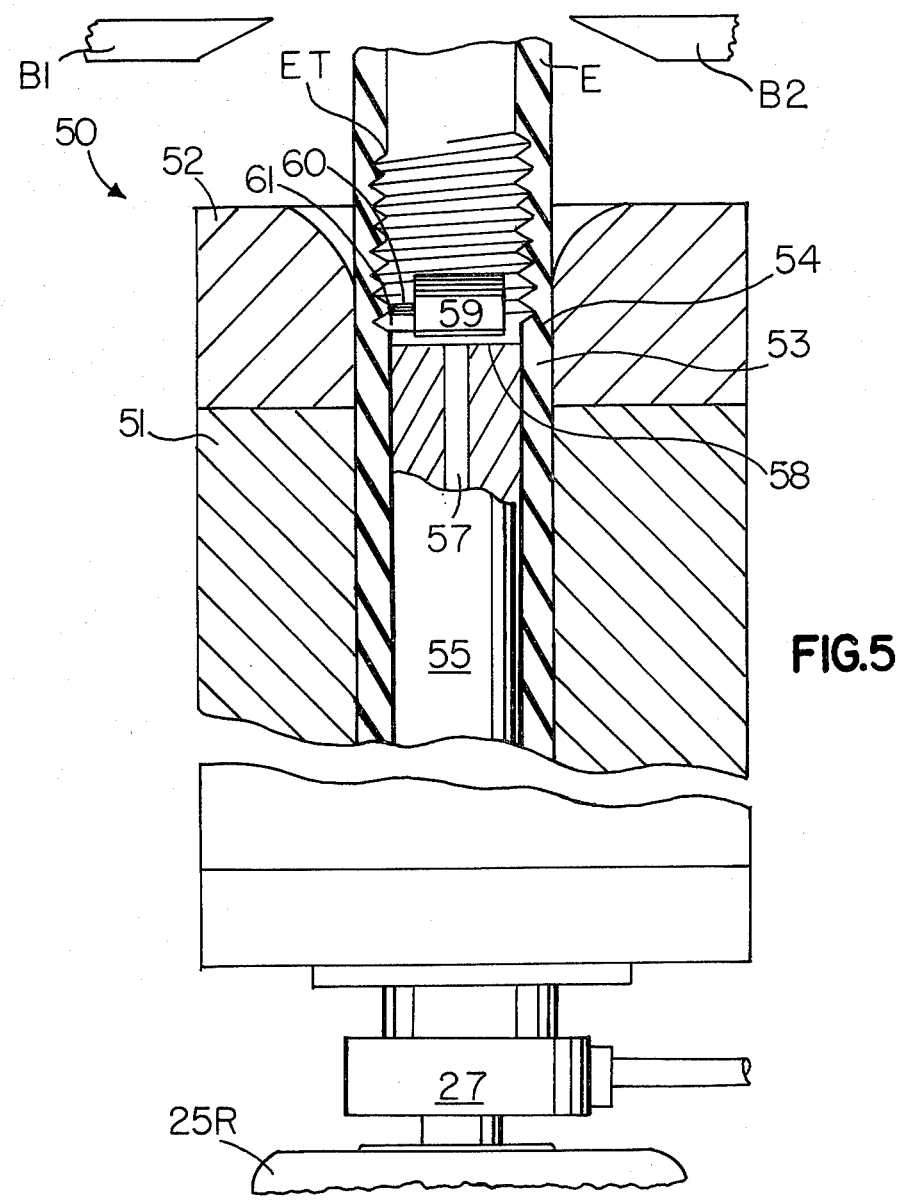
FIG. 5 is a side view of an extrusion apparatus for threading the inside of a tubular extrusion.

There is shown in FIG. 1 an extrusion apparatus 10 which includes an extruder 11 for an extrusion flowable material such as a plastic or ceramic material flowed into an extrusion chamber 11 which is defined by a circumscribing wall 12, by means of an extrusion screw 16 located within a branch chamber 15 which communicates with the chamber 11. A suitable conventional drive motor 17 has its output shaft 17S connected to the shaft of the screw 16 and operates to rotate said screw for feeding material introduced into the branch chamber 15 from a remote source into the chamber 11 through which it flows over a mandrel 20 which extends longitudinally through the chamber 11 as an elongated shank 21 which passes through the extrusion die 13 located at the end of the chamber wall 12. The end 22 of the mandrel 20 is enlarged and tapers outwardly as shown. A circular lip 23 circumscribes the head or end 22 of the mandrel and is shaped to define the inside surface of the tubular extrusion E formed between the mandrel and the die as it passes from the extruder.

The lip 23 is so configured and located that it may cooperate with the end of the extrusion die 13 in varying the shape of the surface stratum of the tubular extrusion, depending on the longitudinal location of the mandrel with respect to the die. In other words, slight variations in the inside diameter of the tubular extrusion E may be effected by longitudinally moving the mandrel 20 a slight degree towards and away from the inside surface of the die 13 located adjacent the lip formation 23.

Accordingly, the mandrel 20 is shown extending completely through the chamber 11 and an opening 19 in an end wall 18 of the chamber. A seal 19S is located between the end wall and the surface of the mandrel 20 to prevent outflow of extrusion material and a portion 24 of the mandrel protrudes beyond the end wall which portion is coupled to the shaft 26 of a suitable lineal actuator 25 which is operable to move the mandrel 20 a predetermined degree back and forth within the extrusion chamber and die.

The lineal actuator 25 may be of any suitable design and may comprise an electric motor with a suitable mechanism connected thereto for providing oscillating longitudinal movement of its output shaft, an air or hydraulic motor or ram, the piston of which may be pulsed by variably applying fluid pressure thereto, a solenoid which may be of the bi-stable or mono-stable type which may be intermittently operated to intermittently drive the mandrel 20 back and forth within the extrusion chamber or a transducer such as a piezoelectric transducer or magnetostrictive transducer operable to oscillate the piston longitudinally a brief degree for variably forming the inside surface of the tubular extrusion as it flows over the head of the mandrel by the described cooperation between the lip 23 and the surface 24 of the die.

The degree and frequency of movement of the mandrel will, of course, be a function of the desired change in shape of the wall of the extrusion considered in view of the configuration of the mandrel, the lip and the extrusion die as well as the rate of flow of extrusion material through the extruder. For slight displacements of the mandrel very fine striations, say in the range of 0.0005" to 0.005" in depth and separation and circular in configuration, may be formed in the surface stratum of the tubular extrusion which may be used as means for roughening the tube wall to receive a coating or liner tube expanded therein or to reduce the boundary layer drag by creating local turbulence in the flow of a fluid through the tube. Depending on the diameter of the tube, striations of greater depth and separation from each other may be similarly formed by the provision of a suitable actuator and mechanism associated therewith for longitudinally moving the mandrel during extrusion.

In another form of the invention, illustrated in FIG. 1, the lineal actuator 25 may be operable to rotate the mandrel 20 within the extrusion chamber during extrusion and the lip formation 23 at the end of the mandrel may comprise a single protrusion or irregular formation in the mandrel which is operable to deform the tubular extrusion with a spirally shaped groove or striation, the separation of which would be a function of the rate of flow of extrusion material over the mandrel and the velocity of rotation of the mandrel.

In another form, the lip 23 may be replaced by a plurality of protrusions located at or near the end of the mandrel which either cooperate in forming a single groove in the wall of the extrusion or which form separate grooves, one next to the other, in the wall of the extrusion as the mandrel rotates.

Also shown in FIGS. 1 and 2 is a passageway extending through the mandrel for conducting a heat transfer fluid such as air, a refrigerant to branch passageways terminating at the end of the mandrel. The central passageway 29, shown in detail in FIG. 2 extends centrally through the mandrel 20 from a rotary coupling 27 connected to the portion 24 of the mandrel protruding from the end wall 18 of the extrusion chamber. A tube 28 extending from a source of pressurized heat transfer fluid, conducts said fluid to the coupling, from which it flows to branch passageways 29B in the head end 22 of the mandrel and is expelled out openings 30 at the end of the mandrel and flowed against that portion of the extrusion E which has just been deformed by the lip 23 to rapidly set same to retain the deformations therein substantially as they are made or in a modified configuration. The coupling 27 is either adapted to move longitudinally with the mandrel 20 or remain stationery while the mandrel slidably moves back and forth therein. One or more nozzles 31 may be disposed around the extrusion E for flowing heat transfer fluid such as gas or liquid to effect the rapid setting thereof and the retention of the deformations in the surface stratum of the inside of the extruded tube.

If the tubular extrusion E is directed upwardly as it forms (e.g. the extrusion chamber has its longitudinal axis directed vertically), then a heat transfer liquid such as cool water may be directed through one or more passageways in the mandrel, circulated to a certain depth within the extrusion portion disposed above the mandrel and returned to other passageways having openings at the end of the mandrel and flowed therethrough to another rotary coupling near the far end of the mandrel so as to rapidly cool and set the tubular extrusion without the need to flood the exterior thereof with coolant. If the extrusion is made of a thermosetting resin, the fluid so circulated may be a heated fluid capable of transferring sufficient heat to the tubular extrusion to either set or substantially set the material thereof as it travels upwardly. If the material extruded is a metal such as aluminum, it may not be necessary to rapidly cool the extrusion to retain the grooves or serrations formed on the inside surface of the extrusion. FIG. 1 shows a pipe 32 supported above the extrusion E and supporting a plurality of nozzles 31 which direct heat transfer fluid against a length of the extrusion.

In FIG. 3 tooling in the form of a rotatable blade or disc 36 is provided at the end of an extrusion mandrel 33 of the type described, and is shaped with a cutting or deforming portion 37 adapted to rotate against and form a spiral thread-like groove ES in the surface stratum of the inside wall of the extrusion E. The blade or offset disc 36 is rotatably supported on a ball bearing 38 which is retained within a cavity 33C in the head 33H of the mandrel 33. The blade or disc 36 is power rotated on a shaft 35 which passes through a bore 34 extending longitudinally through the mandrel from the end thereof which extends beyond the far end of the extrusion chamber and is connected to a constant speed drive motor (not shown) for rotating same. The motor driving shaft 35 may also be situated within a cavity in the mandrel. The thread ET formed by tool 36 may comprise a fine spiral groove for reducing boundary layer drag for fluid flowing through the pipe or may be dimensioned to serve as a retainer for a male threaded fitting or plug. Said thread may also be selectively applied to the inside surface of the tubular extrusion E by providing means within or at the end of the mandrel for advancing and retracting the tool 36 in a radial direction towards and away from the wall of the extrusion as it is rotated or as the mandrel rotates carrying said tool in a circular path at the end thereof. Thus tooling which is more complex than shown, may be supported for rotation and/or radial movement at the end of the mandrel or may be rotated with rotation of the mandrel by a constant speed drive means secured to the end thereof which protrudes from the far end of the chamber.

Also shown in FIG. 3 are a plurality of outwardly extending passageways 39 connected to the center passageway 34 or bore through which shaft 35 also extends for flowing heat transfer fluid as described to openings in the end of the mandrel for flowing same against the extrusion as it leaves the end of the extrusion die. It is noted that the passageways 29B and 39 of FIGS. 2 and 3 may be used to conduct a coating fluid or plastic and spray or extrusion coat same against the entire or selected portions of the inside surface of the tubular extrusion.

In yet another form of the invention, it is noted that the mandrel head 22 of FIG. 1 may be segmented with at least one portion thereof containing the serrating or threading tool or lip cantelever supported on the mandrel and operable to be projected outwardly to engage or deform or machine in the inside surface of the extrusion wall when so projected against the extrusion. Reference is made to FIGS. 1 and 2 of parent application Ser. No. 68,724, now U.S. Pat. No. 3,708,253 for details of an expanding mandrel head structure which may be modified with a threading or serrating peripheral lip to perform the functions described herein and provide a threaded formation along all or selected portions of the extruded tube wall. The mandrel may also be shaped and operable as in FIGS. 1 and 2 of said copending application, to bell or expand predetermined portions of the extruded tube to facilitate the joining of sections thereof together after they are cut to length.

In still another form of the invention, gas such as air ejected at high velocity from the passageways 29B or 39 of the mandrels illustrated either as a steady streams or pulses thereof, may operate to deform the freshly formed tubular extrusion with cavities, threading, channels or serrations as described.

In FIG. 4 is shown yet another arrangement for serrating or surface roughening the inside surface of a tubular extrusion E as it is formed. The apparatus 40 includes an extruder 41 having a die 43 with a die opening 44 in which extrudate such as a polymer is formed to shape over a mandrel head 46 extending from a mandrel 45 supported in the extrusion chamber. Secured to the end of the mandrel head 46 is a circular disc 48 of ferromagnetic material. The periphery 49 of the disc 48 is shaped with a sharp edge 49′ which normally penetrates the inside surface of the tubular extrusion E. Disposed around the die 43 is a circular electromagnet 50 having a sufficient number of field windings of wire to generate an intense enough magnetic field when energized with a suitable source of electrical energy to cause the disc 48 to deform and vary the radial location of the circular edge 49′ of disc 48. Thus by applying current intermittently to the electromagnet 50 or applying suitable alternating current thereto, the disc 50 may be made to variably perform on the inside surface of the extrusion E and form fine serrations or undulations therein. The electro magnet 50 may also be operable to cause variations in the dimensions of the die 43 and/or mandrel head 46 with or without causing variations in the disc 48 depending on the relative materials employed and their dimensions, so as to provide fine surface stratum variations in the extrusion's inside wall portion. Accordingly, if the disc 48 is eliminated, a lip may be provided at the periphery of the mandrel head 46 to variably form the extrusion with fine serrations ET as described while coolant ejected from a plurality of holes 47 through the mandrel may be employed to rapidly set the extrudate and retain the deformations therein.

In FIG. 5 is shown a pipe threading arrangement embodying features of the invention which have been described and permitting selected portions of the inside wall of a tubular extrusion to be automatically formed with thread-like formations ET for one or more purposes which will be described. The apparatus 10 includes an extruder 51 having a die 52 with an opening 53 therein and a mandrel 55 supported within said opening to define a tubular extrusion E when extrudate is forced through the annular extrusion space 54 between the die opening wall and mandrel. The mandrel 55 has a lineal actuator 59 secured to its front face 58 which actuator has a blade 61 secured to its shaft 60 wherein the tip portion 62 of the blade is shaped to form a thread-like channel ET in the wall of the tubular extrusion E when the blade is projected as shown and the mandrel 55 is power rotated. In other words, the actuator 59 is secured to rotate with the mandrel and is adapted to have its shaft projected and retracted to cause the tip of the blade 61 to enter the wall of the extrusion E while threading same and to clear same when it is desired to provide the extrusion wall to be free of such threading. The actuator 59 may be air or hydraulically actuated by a fluid admitted through a solenoid valve (not shown) connected to a passageway 57 in the mandrel 55 through a rotary coupling as shown in FIG. 1 as the mandrel 55 is power rotated by a motor 25R. The actuator 59 may also comprise a solenoid connected to a source of energizing electrical energy through wires extending through the passageway 57 from a rotary electrical coupling means located exteriorally of the extruder. By selectively operating the actuator 59 during extrusion and controllably rotating the mandrel 55 or the tooling at the end thereof, selected portions of the inside surface of the wall of the extrusion E may be threaded to render the extrusion more flexible therealong permitting it to be easily bent or to provide threads along a portion of the tube which becomes an end portion when the extrusion is cut to selected lengths by a conventional cutter.

In a preferred form of the instant invention, a cutting device is provided downstream of the extrusion die 52 and is automatically controlled in its operation to cut lengths of the extrusion E from the main extrusion either at the beginning or end of each selectively threaded portion of the extrusion or through each selectively threaded portion so as to either provide lengths of tube or pipe which are each threaded at one end or are each threaded at both ends. Notations B1 and B2 refer to a plurality of cutting blades of a cutting tool of conventional design which blades may be orbitally rotated about the extruding tube E and automatically controlled to engage and disengage the selected portions of the extrusion to cut the extrusion as described to selected lengths of tube or may be rapidly advanced and retracted from the extrusion to cut same by a shearing action either cutting operation being made while the cutting tooling is fixed or in movement with the extrusion and under the automatic control of a multi-circuit automatic controller or timer as disclosed, for example in parent U.S. Pat. No. 3,708,253, to cause the cutting of the extrusion along or adjacent to each of the threaded portions thereof.

Other forms of the instant invention are noted as follows:

I. The mandrel 55 of FIG. 5 may extend substantially beyond the end of the extrusion die and may serve as a support for external tooling which may be supported by the extruder or die and may be operated to engage and disengage the outer surface of the extrusion as it passes from the die along the mandrel and to cut or thermoform selected lengths of the outer stratum of the tube wall as it extrudes to shape and exits from the die to provide external threads or other formations along the portions thereof intended to define the ends of lengths of such tubing when cut to shape thereafter. In one form such external tubing may be a threading tool which engages and rotates around the select lengths of the extruding tube as the tube moves longitudinally along the mandrel to cut or thermally deform a thread in the outer wall thereof.

II. The mandrel 55 of FIG. 5 may extend a distance beyond the end of the die and the tooling may comprise two or more sections of a forging or thermoforming die adapted to engage and/or more longitudinally with the extrusion as it passes along the mandrel and to thermally deform threads in selected lengths of the extrusion after which the described cutting tool may operate to cut the extrusion to select lengths with each length containing one or more threaded portions at its end or ends. The extrusion may be in a defomable condition or may be heated by the tooling as it engages same and moves therewith.

The described thread forming tooling, cut-off tool and extrusion apparatus may be under the control of a master controller or computer to synchronize operation of all components to effect the results described above including the forming of selected lengths of an extrusion as it extrudes to shape with thread like formations and the predetermined cutting of lengths of such extrusion to provide such lengths with threaded end portions.

I claim:

1. An apparatus for forming and automatically threading tubing comprising:
   first means for extrusion forming a cylindrical tube to shape from an extrusion material,
   second means including a rotating tool supported adjacent said first means for intermittently engaging and disengaging a portion of the wall tube as it is formed and providing screw thread-like formations along selected lengths of the tube to the exclusion of the remaining portions of the extrusion wherein the tubing retains its extruded cylindrical shape along those portions of the extrusion which are not operated on by said second means and the threads so formed are shaped to retain similarly threaded fittings in fastening engagement therewith,
   third means supported downstream of said first and second means for operating on said extrusion to cut the extrusion to predetermined length, and
   fourth means for synchronizing the operation of said second and third means wherein each of the cut lengths of said extrusion contains at least one end thereof having said thread-like formations provided therein and shaped for retaining a fitting in threaded assembly on said end.

2. An apparatus in accordance with claim 1 wherein said first means includes an extrusion die and means for forcing extrudate through said die, a mandrel supported by said die for defining the inside surface of the wall of the extruded tube when extrusion material is forced from said die over said mandrel.

3. An apparatus in accordance with claim 2 wherein said second means is supported by said mandrel and is disposed thereon within the tubular extrusion formed over the mandrel, said second means including a threading tool supported on said mandrel and means for power rotating said threading tool within the tubular extrusion, means for moving said threading tool in a manner wherein said threading tool is disposed inwardly of the wall of the tubular extrusion to a position wherein said tool engages and forms the extrusion wall so as to provide said thread-like formation in the tube wall when in engagement therewith.

4. An apparatus in accordance with claim 3 wherein said means for power rotating said threading tool is operable to rotate said mandrel with the tool to cause the tool to rotate within the tubular extrusion and to thread-form the wall thereof when said tool engages said wall as the extrusion passes from said mandrel.

5. An apparatus in accordance with claim 3 wherein said tool is power rotated on said mandrel at the end thereof.

6. An apparatus in accordance with claim 3 wherein said means for moving said tool into engagement with the wall of said extrusion includes an actuator supported by said mandrel.

7. An apparatus in accordance with claim 6 wherein said actuator includes a piston supported for movement within said mandrel and fluid pressure means for urging movement of said piston within said mandrel, said piston being operatively connected to said tool for moving said tool outwardly from said mandrel into engagement with the extrusion formed on said mandrel.

8. An apparatus in accordance with claim 7 wherein said tool is supported at the end of said mandrel and is operable to be radially advanced and retracted with respect to the longitudinal axis of said mandrel.

9. An apparatus in accordance with claim 1 wherein said second means includes a threading tool with a tool operating member operable to be advanced against and retracted from the surface of said tube to engage and penetrate the wall of said tube, and means for effecting relative rotation of said tool operating member and said tube about the longitudinal axis of said tube while said tube is in longitudinal movement so as to cause said tool operating member to form a spiral thread-like formation in the wall of said tube.

10. An apparatus in accordance with claim 9 wherein said threading tool is supported within said tube and said tool operating member is operable to be advanced against the inside surface of said tube and to be retracted therefrom at selected times during the extrusion of said tube so as to form spiral thread-like formations for predetermined distances along selected portions of the wall of the tube as it is extruded to shape.

* * * * *